TELEVISION SYSTEM CONVERSION DEVICE

Filed Sept. 20, 1962

INVENTORS
MASATOSHI OKAZAKI
MASAO INABA

BY

OSTROLENK, FABER, GERB & SOFFEN
ATTORNEYS

United States Patent Office 3,267,207
Patented August 16, 1966

3,267,207

TELEVISION SYSTEM CONVERSION DEVICE

Masatoshi Okazaki and Masao Inaba, Minatoku, Tokyo, Japan, assignors to Nippon Electric Company Ltd., Tokyo, Japan, a corporation of Japan Filed Sept. 20, 1962, Ser. No. 230,781
Claims priority, application Japan, Sept. 22, 1961, 36/34,376
8 Claims. (Cl. 178—5.2)

Figure 1:
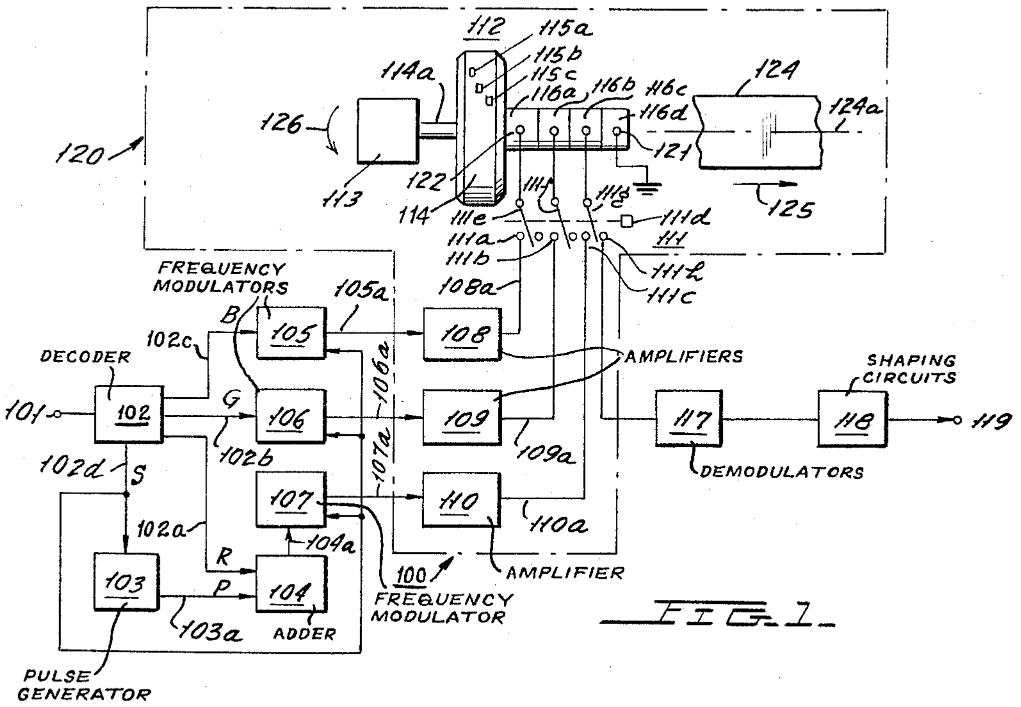

This invention relates to television systems and more particularly to conversion systems for use in color television systems and the like, which is uniquely adapted to convert signals characteristic of the simultaneous color system to signals characteristic of the line or field sequential (hereafter referred to as line sequential only) color system.

The system is further adapted to operate with equal success in the reverse direction. That is, it is capable of converting from the field or line sequential system to the simultaneous color system.

The Japanese television broadcasting standard system, as well as the standard system of other countries of the world, is a simultaneous color television system which takes the form of a composite signal which is derived from the superposition of a brightness signal which corresponds to the luminance of the scene to be transmitted, together with a chrominance subcarrier signal having a frequency of approximately 3.6 megacycles, which subcarrier signal is modulated according to the degrees of color saturation and hue of the scene which correspond to the amplitude and the phase, respectively, of the modulated subcarrier signal.

Color television systems of this type have many distinct advantages when used for broadcasting purposes. However, for various reasons, it is frequently necessary to provide the capability to convert such a simultaneous, or dot sequential system to the field, or line sequential systems. Such conversion arrangements thereby make available color television reception to facilities having only field or line sequential capabilities by enabling utilization of simultaneous system signals.

The instant invention provides such a capability by the employment of a decoding means for converting signals of the simultaneous system into independent signals representing the three primary colors. These signals are employed to frequency modulate carrier type signals and, together with suitable synchronizing pulses, are impressed upon the inputs of the recording amplifiers of a tape recorder facility. The independent signals are subsequently recorded on a moving magnetic tape medium by means of rotating magnetic record heads which generate predetermined flux patterns in the magnetic material of the tape medium representative of the independent primary color signals.

The conversion is effected by altering the rotational speed of a single read out head relative to the rotating speed of the magnetic record heads so that each line of one sequence of primary color signals is read out at substantially the same amount of time in which the signals of the primary color signals were recorded by the plurality of independent record heads. The signals read out from the tape recorder facility are suitably demodulated to derive the video signal and subsequent thereto are passed through circuitry which suitably shapes the blanking and synchronizing signals and the video output signal such that this signal may now be employed in a line sequential reproduction system resulting in a reproduction of the original scene which was transmitted in accordance with the simultaneous color television system.

It is therefore one object of this invention to provide a novel conversion means for converting signals of the simultaneous system to signals of the line sequential system.

Another object of this invention is to provide a conversion device for color television reproduction which is so designed as to convert signals of the line sequential system to signals of the simultaneous system.

Still another object of this invention is to provide a conversion system for color television reproduction which employs a tape recording facility having a rotary driven drum head.

Figure 2:
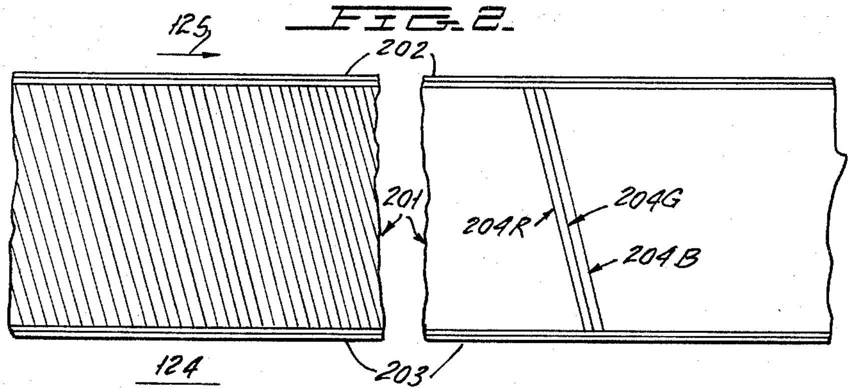

These and other objects of the invention will become apparent when reading the accompanying description and drawings in which:

FIGURE 1 is a block diagram of a conversion system designed in accordance with the principles of the instant invention. FIGURE 2 is a diagram showing the magnetic flux pattern generated in a magnetic tape medium in accordance with the recording operation of the device of FIGURE 1.

Referring now to the drawings: FIGURE 1 shows a conversion system for use in color television reproduction systems and the like, which is designated generally by numeral 100 and which is specifically adaptable for use in the conversion of video signals of the NTSC type into line sequential video signals. Video signals of the NTSC type are fully set forth in the publication Colour Television, the NTSC System Principles and Practice by P. S. Carnt and G. B. Townsend, copyright 1961 by Iliffe Books Ltd. and the system details and operation set forth in this publication are incorporated herein by reference thereto.

The conversion system 100 is comprised of an input terminal 101 for receiving a composite color television signal such as the NTSC system signal, for example. The input signal is impressed upon a decoder circuit 102 which functions to decode the composite color television signal into three primary color signals, namely, red, green and blue, which appear at the output terminals **102*a*–102*c*, respectively. The decoder circuit 102 is further adapted to generate a synchronizing pulse S at its output terminal 102*d***. Such decoders are more fully set forth in Chapter 9 of the aforementioned publication referred to above.

A color pulse generating circuit 103 is provided for receiving the synchronizing pulse S so as to generate a pulse P at its output terminal **103*a* for insertion as the pilot signal of the color phase of the line sequential signal having a repetition rate or scanning rate which is selected by appropriate adjustment of the color pulse generating circuit 103**.

For the purposes of describing the operation of the conversion system 100, it will be assumed that the sequence of primary colors is taken in the order of red, green and blue, and this being the case, it is then suitable to produce the pilot signal P immediately prior to the start of the red line scanning. In other words, so as to insert a pilot pulse of substantially narrow pulse width into that time period of the video signal which corresponds to the back porch of the horizontal synchronizing pulse. A color pulse adder circuit 104 is provided for suitably combining the red color signal and the pilot signal obtained from the outputs 102*a* and 103*a* respectively and to impress the composite signal developed at its output terminal 104*a* upon a frequency modulation circuit 107. Three such frequency modulation circuits 105–107 are provided for the primary color signals, blue, green and red, respectively, which signals are employed to suitably frequency modulate a local carrier signal generated in each circuit 105–107. The frequency modulators 105–107 may be substantially identical but, it is desirable to make the operating frequency of each [which frequency corresponds to the standard portion such as the pedestal portion of the modulated wave] FM modulator equal to one another. It has been found to be favorable for the purpose of adjusting the modulators to generate a keyed clamp after receiving the synchronizing signal S at the output terminal 102*d* of decoder 102. This manual operation is widely known and employed by technicians who handle such television instruments. This operation is effected by impressing the output signal S upon one input terminal of each frequency modulator circuit.

The output terminals 105*a*–107*a* of the frequency modulators 105–107, respectively, are connected to the associated inputs of suitable recording amplifiers 108–110, respectively, which are provided for the purpose amplifying and applying the frequency modulated signals modulated from red, green and blue, respectively, to the recording head assembly 112 of a suitable magnetic tape recording facility 120.

The output terminals 108*a*–110*a* of the amplifiers 108–110, respectively, are connected to the stationary contacts 111*a*–111*c*, respectively, of the switch structure 111. Switch structure 111 is provided with an operating means 111*d* for controlling the movable arms 111*e*–111*g*, respectively so as to connect each rotary arm to its associated stationary contact when the switch operating means 111*d* is moved in the left-hand direction and such that the rotary arms 111*e* and 111*f* become electrically isolated from any input means while rotary arm 111*g* engages stationary contact 111*h* in order to effect the read out operation in a manner to be more fully described.

The recording facility 120 is comprised of a multi-head record and read out structure 112 which includes a drum 114 mounted for rotation about a shaft 114*a*. The primary mover for shaft 114*a* and drum 114 may be any suitable motor such as the motor means 113, shown in FIGURE 1.

The rotary drum 114 has a plurality of magnetic read record heads 115*a*–115*c* positioned along the periphery of drum 114 in a staggered manner, as shown in FIGURE 1. The magnetic heads 115*a*–115*c* are secured to drum 114 so as to rotate with the rotation of drum 114. The magnetic record heads are further insulated from one another so as to maintain independent channels for the modulated signals generated at the output terminals of the amplifiers 108–110, respectively, in a manner to be more fully described. As should be noted, the magnetic record heads 115*a*–115*c* are positioned in close proximity to one another in order to effectively perform the recording operation, in a manner to be more fully described.

A slip ring arrangement 116 is mounted on shaft 114*a* on the right-hand side of drum 114 such that slip rings 116*a*–116*c* are electrically connected [by means not shown] to the record heads 115*a*–115*c*, respectively, while the slip ring 116*d* is electrically connected to ground potential by means of the brush 121 which makes wiping contact with slip ring 116*d* so as to continuously connect it to ground or reference potential. It should be understood that the slip rings 116*a*–116*d* are electrically insulated from one another. The recording amplifiers 108–110 are connected to the record heads 115*a*–115*c* in the following manner, a description of only one such connection being given here for simplicity sake, it being understood that the remaining amplifiers are connected in a similar manner.

When the switch operating means 111*d* is moved towards the left, rotary arm 111*e* makes electrical contact with stationary contact 111*a*. This establishes a conductive path from recording amplifier 108, stationary contact 111*a*, movable arm 111*e*, brush 122 which makes wiping contact with slip ring 116*a* which in turn is electrically connected to record head 115*a*.

From the view point of mechanical performance of the tape recording facility 120 there is no modification of the head elements 115 in comparison with those used in the magnetic recording and reproducing devices which are widely used for television signals at present. The feeder connection for each head [not shown] may be effected by providing a second brush [not shown] which makes wiping contact with the slip ring in a manner substantially similar to the slip ring and brush arrangement for connecting the recording amplifiers, as shown in FIGURE 1.

Since the drum head, rotation control part, the tape transport mechanism and the peripheral elements which control these devices need not be especially adapted to practice the instant invention, a detailed description of these elements have been omitted for purposes of clarity. Suffice it to say that the subsequent description of the magnetic pattern of the record tape will make it clear, it is possible to use substantially the same device as the conventional television tape recorder with only slight modifications to be made in accordance with the following description.

The dynamic operation of the recording system is as follows:

Tape transport means (not shown) provides suitable movement of the magnetic tape 124 so that the tape moves linearly in the direction shown by arrow 125. Only a small portion of magnetic tape has been shown in FIGURE 1 for purposes of clarity, but it should be understood that the magnetic tape 124 is positioned relative to the drum 114 so that it is substantially tangential to the surface of drum 114 and is positioned in close proximity to the surface, the air gap between these elements being chosen in accordance with present day magnetic recording practice. In addition thereto the longitudinal axis 124*a* of the tape is such that it is substantially parallel to the longitudinal axis of the shaft 114*a*.

As the tape 124 is moved in the direction shown by arrow 125 the drum 114 is rotated in the direction as shown by arrow 126 so that the three magnetic recording heads sweep across substantially the entire width of the tape member 124. The simultaneous linear and rotational movements cooperate to generate a magnetic flux pattern susbtantially as shown in FIGURE 2.

FIGURE 2 shows a magnetic tape arrangement 124 which is manufactured by coating a magnetic powder on an insulating substrate 201 which may, for example, be a "Mylar" film which finds widespread use in television tape recorders. Numeral 202 designates the audio or sound track which results from recording the audio signal of the program being received. Numeral 203 designates a control track which records, for example, a sine wave of constant frequency which is employed to permit accurate control of the tape feed speed during playback. 204 designates the video tracks which result from recording the picture signals in the form of frequency modulated waves by the three magnetic heads 115*a*–115*c*. As was previously described, the rotation of drum 114 takes place concurrently with the linear movement of tape 124 of FIGURE 1 so that the red, green and blue video tracks which are shown in the right-hand segment of tape 124 in FIGURE 2 by the numerals 294R, 204G and 204B respectively. It should be understood that with the tape 124 being held substantially stationary, these tracks 204 would be substantially perpendicular to the audio and timing tracks 202 and 203 respectively. However, the movement of tape 124 in the direction shown by arrow 125 causes these tracks to be oriented at an interior angle less than 90° relative to the tracks 202 and 203. Each of the red, green and blue signals are applied with equal intervals to one another to the tape 124 and each signal has the same phase during a single horizontal scanning period.

In order to simplify the mechanical placement of the record heads 115 so that they are in close proximity to one another it has been found advantageous to compensate for any phase differences between the magnetic heads 115*a*–115*c* by employing suitable delay devices such as delay lines (not shown) which may be installed as an integral part of the recording amplifiers 108–110 and which are adjusted after the recording heads 115 have been physically arranged so that the video tracks 204R, 204G and 204B have the required equal intervals. After making the appropriate adjustments to compensate for any phase differences the r.p.m. of the drum 114 and the tape feed velocity are then controlled so that the repetitive tracks of the red, green and blue signals have equal intervals throughout the entire length of tape 124 as shown in the left-hand segment of tape 124 in FIGURE 2.

For the reproduction or playback operation the conversion system 100 provides the playback circuit for the recorded tape by moving the operating means 111*d* of switch 111 in the right-hand direction. This causes movable contacts 111*e* and 111*f* to be completely isolated from the circuit while movable contact 111*g* electrically engages stationary contact 111*h*. This establishes an electrical path from magnetic head 115*c*, slip ring 116*c*, movable contact 111*g*, stationary contact 111*h* to the input terminal of a demodulation circuit 117. The tape 124 is then moved at the same tape feed velocity as that employed during the recording operation. The drum 114, however, is rotated at a speed which is substantially three times the rotational speed of the drum during the record operation for a reason to be more fully described. The supporting angle of head 115*c* is also changed slightly so as to optimize magnetic coupling between tape 124 and head 115*c* during the read back operation. To increase the number of revolutions of drum 114 to precisely three times that of the recording operation the frequency of the drum driving signal may thereby be made there times that of the frequency of the head driving signal employed during the recording operation.

The process of reproduction is conducted as follows: The magnetic play back head 115*c* is inductively coupled with all of the recorded image tracks such as, for example, the tracks 204R, 204G, 204B in a one by one sequence. The magnetic head 115*c* does not trace exactly on the video track and since it does not become parallel to the video tracks a correction should be made so that the head element 115*c* keeps tracing wholly along the track by slightly inclining the supporting angle of the head away from the angle of inclination employed during the recording operation. With the rotational speed of drum 114 being three times greater during read back than during recording it can be appreciated that the single head 115*c* will be inductively coupled to the three tracks such as, for example, the three tracks 204R, 204G, 204B, which were generated by all three heads 115*a*–115*c* during the recording operation. The frequency modulated wave which is then read out by the read out head 115*c* is such that the signal generated by head 115*c* due to the geometrical operation of the magnetic pattern recorded on tape 124 converts the input signals into a frequency modulated wave of the line sequence color television system. The frequency modulated signals available at terminal 111*h* are impressed upon the input of a demodulator circuit 117 which demodulates the frequency modulated signals to derive the video signal according to the line sequential system. The video signal is then fed from demodulator 117 to circuit 118 which suitably shapes the blanking and synchronizing signal portions of the composite video signal and makes this signal available at the output terminal 119.

The frequently modulated signals at the time when the playback head 115*c* is about to pass from one scanning line to the next scanning line [i.e., 204*b*–204*g*] becomes cutoff for a moment. This action introduces harmful superimposed impulse noise into the video signal when being demodulated. In order to eliminate such impulse noise from the video signal the phase relationship between the recorded magnetic pattern and the ultimate video signal is so arranged that the impulse noise may take place during the interval of a synchronizing pulse and also by further suitably shaping the demodulated synchronizing signal. These functions are performed by the pulse shaping circuit 118.

The above description sets forth a conversion of a simultaneous color television signal to the line sequential color television signal as one example of the invention. It should be understood that conversion can take place to the field sequential color television signal from the simultaneous color television signal based on the same principles set forth above. That is to say, the only distinction being whether a single line scanning period is equated to a single video track as described above, or as an alternative whether the video track is allowed to slant to a greater extent and to correspond to a single field scanning period.

The method to correspond either scanning line or field to a single video track has no relation with the principle of the present invention. Conversion from simultaneous system to field sequential system may be realized by combining the above mentioned procedure of conversion from simultaneous system to line sequential system with the same procedure as employed in recording and reproducing the one television field period on a single video track for the single head television tape recorder. Further, although, for the convenience of explanation, an example was given of the conversion of the simultaneous color television signal to the sequential color television signal, it is noteworthy that the device shown in FIGURE 1 will enable conversion from the line sequential system to the simultaneous system if it is operated in the reverse direction to that described.

Furthermore, it is needless to say that such a procedure, as an example of this application, will be practicable that will continuously convert and send out with delay of only very short time from the input signal by providing the recording and reproducing heads independently and by making use of endless tape or drum recorder as the recorded object and also by additional use of an erasing head.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Reversible means for use in converting between video signals of the simultaneous type and video signals of the line sequential type comprising a recording medium; means for recording at least two primary color signals simultaneously in parallel columns in said recording medium; readout means adapted to scan each of said columns sequentially to generate said line sequential signals, said recording means comprising means for converting a composite video signal of the simultaneous type into at least two independent primary color signals, said recording medium being a magnetic storage means, said recording means comprising at least two magnetic recording heads for recording said independent primary color signals in said magnetic storage means, means for moving said magnetic storage means linearly relative to said recording means; means for rotating said magnetic recording heads, the plane of rotation of said recording heads being transverse to the direction of movement of said magnetic storage means; means for demodulating the recorded primary color signals; switch means operative to isolate said recording means from said composite video signals and to connect said readout means with said demodulating means.

2. Reversible means for use in converting between video signals of the simultaneous type and video signals of the line sequential type comprising a recording medium; means for recording at least two primary color signals simultaneously in parallel columns in said recording medium; readout means adapted to scan each of said columns sequentially to generate said line sequential signals, said recording means comprising means for converting a composite video signal of the simultaneous type into at least two independent primary color signals, said recording medium being a magnetic storage means, said recording means comprising at least two magnetic recording heads for recording said independent primary color signals in said magnetic storage means, means for moving said magnetic storage means linearly relative to said recording means; means for rotating said magnetic recording heads, the plane of rotation of said recording heads being transverse to the direction of movement of said magnetic storage means, said readout means comprising a magnetic readout head, means for rotating said readout head at an angular velocity at least two times greater than the angular velocity of said recording heads during the recording operation; means for demodulating the recorded primary color signals; switch means operative to isolate said recording means from said composite video signals and to connect said readout means with said demodulating means.

3. Reversible means for use in converting between video signals of the simultaneous type and video signals of the line sequential type comprising a recording medium; means for recording at least two primary color signals simultaneously in parallel columns in said recording medium; readout means adapted to scan each of said columns sequentially to generate said line sequential signals, said recording means comprising means for converting a composite video signal of the simultaneous type into at least two independent primary color signals, said recording medium being a magnetic storage means, said recording means comprising at least two magnetic recording heads for recording said independent primary color signals in said magnetic storage means, said recording means further comprising frequency modulation means for frequency modulating said primary color signals prior to the recording operation; decoding means for decoding said frequency modulated signals, switch means having a first and a second operating position connected to said recording readout and storage means; said switch means being adapted to connect said primary color signals to said associated magnetic recording heads when in said first position and being adapted to isolate said recording heads from said primary color signals and connect said readout head to said decoding means.

4. Reversible means for use in converting between television signals of the line sequential type and television signals of the simultaneous type comprising a recording medium; means for recording a signal of the line sequential type representing independent primary color signals in successive parallel columns in said recording medium; readout means for reading out at least two of said columns simultaneously to generate said simultaneous signals, said recording medium being a magnetic storage means, said readout means comprising at least two rotating magnetic recording heads for generating said independent primary color signals from said magnetic storage means, said magnetic heads rotating in a direction transverse to the movement of said recording medium.

5. Reversible means for use in converting between television signals of the line sequential type and the television signals of the simultaneous type comprising a recording medium; means for recording a signal of the line sequential type representing independent primary color signals in successive parallel columns in said recording medium; readout means for reading out at least two of said columns simultaneously to generate said simultaneous signals, said recording medium being a magnetic storage means said readout means comprising at least two magnetic recording heads for generating said independent primary color signals from said magnetic storage means, means for moving said magnetic storage means linearly relative to said recording means; means for rotating said magnetic recording head, the plane of rotation of said recording head being transverse to the direction of movement of said magnetic storage means.

6. Reversible means for use in converting between television signals of the line sequential type and television signals of the simultaneous type comprising a recording medium; means including a magnetic recording head for recording a signal of the line sequential type representing independent primary color signals in successive parallel columns in said recording medium; readout means for reading out at least two of said columns simultaneously to generate said dot sequential signals, said recording medium being a magnetic storage means said readout means comprising at least two magnetic readout heads for generating said independent primary color signals from said magnetic storage means, means for moving said magnetic storage means linearly relative to said recording means; means for rotating said magnetic heads, the plane of rotation of said magnetic heads being transverse to the direction of movement of said magnetic storage means, means for rotating said recording head at an angular velocity at least two times greater than the angular velocity of said readout heads during the recording operation.

7. Reversible means for use in converting between television signals of the line sequential type and television signals of the simultaneous type comprising a recording medium; means including a magnetic recording head for recording a signal of the line sequential type representing independent primary color signals in successive parallel columns in said recording medium; readout means for reading out at least two of said columns simultaneously to generate said simultaneous signals, said recording medium being a magnetic storage means said readout means comprising three magnetic readout heads for generating said independent primary color signals from said magnetic storage means, means for moving said magnetic storage means linearly relative to said recording head; means for rotating said magnetic recording head, the plane of rotation of said recording head being transverse to the direction of movement of said magnetic storage means, means for rotating said recording head at an angular velocity substantially three times greater than the angular velocity of said readout heads during the recording operation.

8. Reversible means for use in converting between television signals of the line sequential type and television signals of the simultaneous type comprising a recording medium; means for recording a signal of the line sequential type representing independent primary color signals in successive parallel columns in said recording medium; readout means for reading out at least two of said columns simultaneously to generate said simultaneous signals, said recording medium being a magnetic storage means said readout means comprising at least two magnetic recording heads for generating said independent primary color signals from said magnetic storage means, means for moving said magnetic storage means linearly relative to said recording means; means for rotating said magnetic recording head, the plane of rotation of said recording head being transverse to the direction of movement of said magnetic storage means, said readout means comprising at least two magnetic readout heads, means for rotating said recording head at an angular velocity at least two times greater than the angular velocity of said readout heads during the recording operation television signals, switch means having a first and a second operating position connected to said recording readout and storage means; said switch means being adapted to connect said primary color signals to said associated magnetic readout heads when in said first position and being adapted to isolate said readout heads from said primary color signals and connect recording head to said decoding means.

References Cited by the Examiner

UNITED STATES PATENTS

| | | | |
|---|---|---|---|
| 2,976,354 | 3/1961 | Banning et al. | 178—6.6 |
| 2,995,620 | 8/1961 | Burr | 178—6.6 X |
| 3,075,041 | 1/1963 | Roizen et al. | 178—5.4 |

DAVID G. REDINBAUGH, *Primary Examiner.*

ROBERT SEGAL, *Examiner.*

J. A. O'BRIEN, *Assistant Examiner.*